March 16, 1926.
J. W. GORDON
1,577,224
PHOTOGRAPHIC SURVEYING AND APPARATUS FOR USE IN CONNECTION THEREWITH
Filed Nov. 3, 1922　　7 Sheets-Sheet 1
*Fig. 1.*
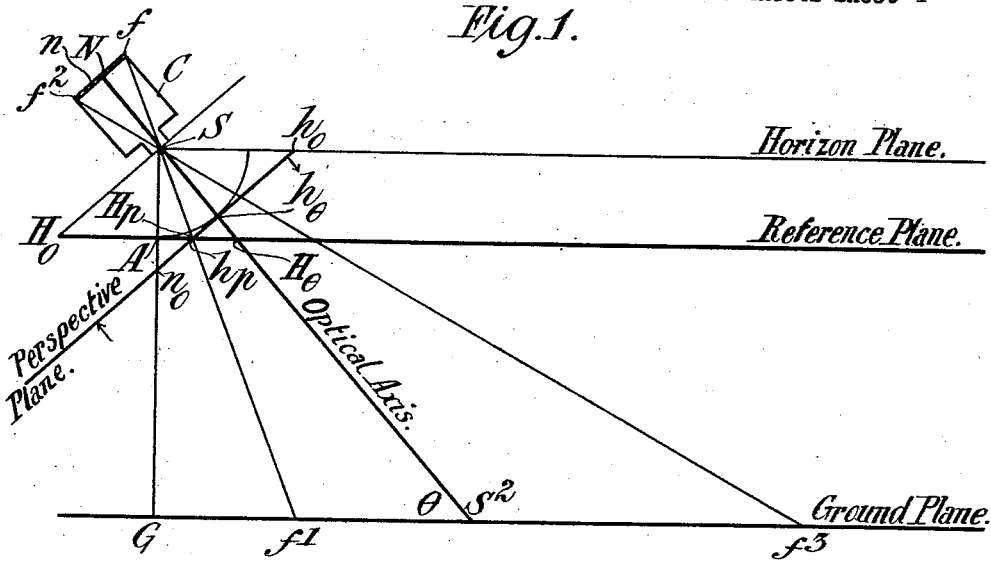
*Fig. 1.ᵃ*
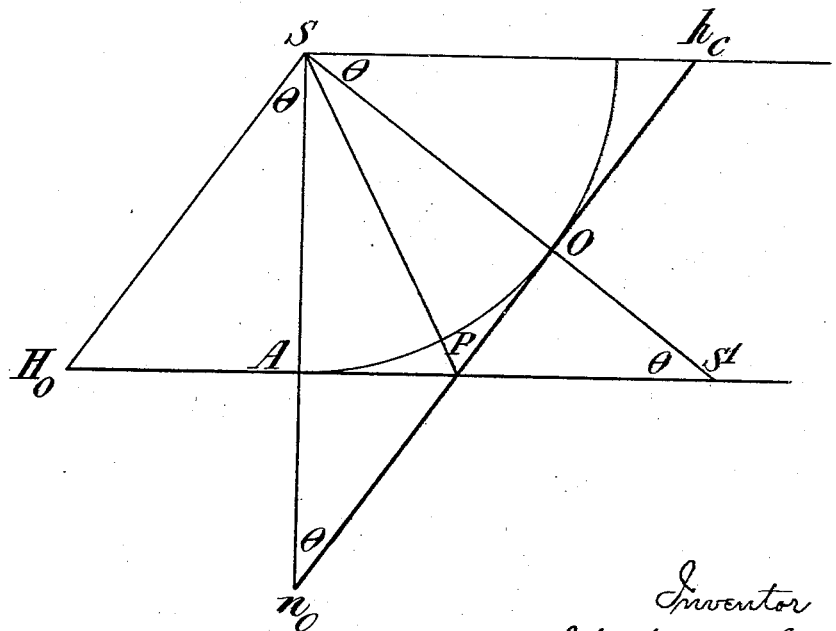
Inventor
John William Gordon.
By [signature] Atty.

March 16, 1926.
J. W. GORDON
PHOTOGRAPHIC SURVEYING AND APPARATUS FOR USE IN CONNECTION THEREWITH
Filed Nov. 3, 1922   7 Sheets-Sheet 2
1,577,224
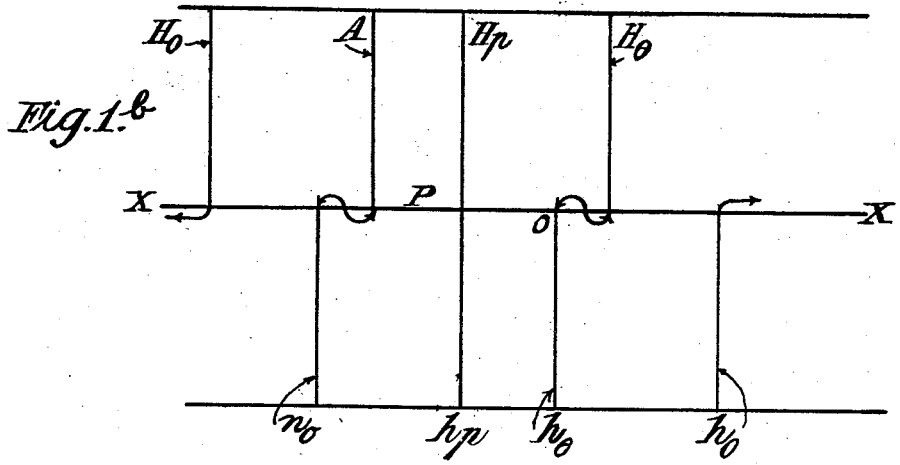
Fig. 1.b
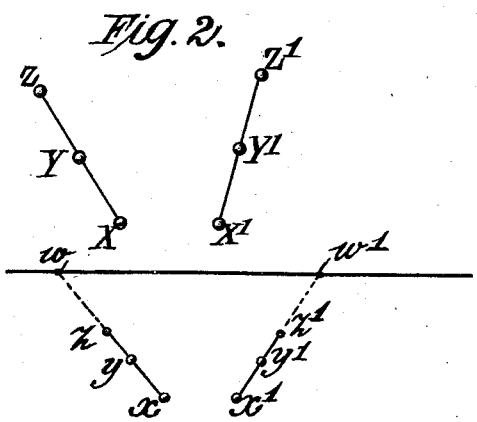
Fig. 2.
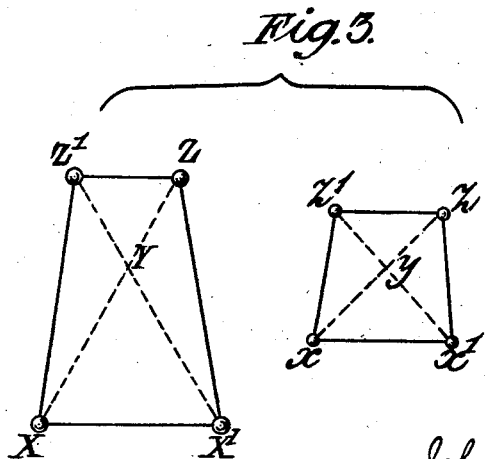
Fig. 3.
Inventor.
John W. Gordon
By
Atty.

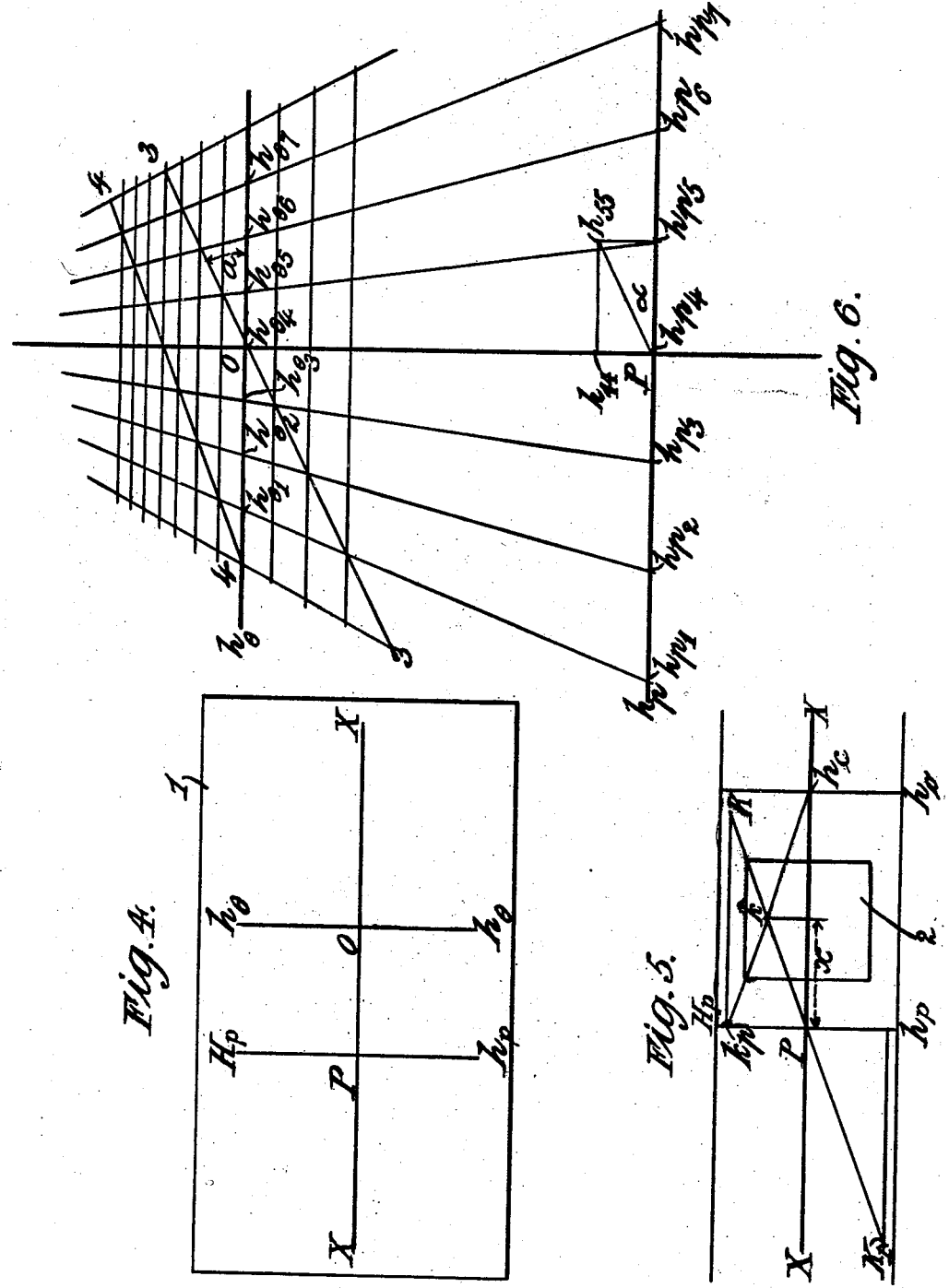

March 16, 1926. 1,577,224
J. W. GORDON
PHOTOGRAPHIC SURVEYING AND APPARATUS FOR USE IN CONNECTION THEREWITH
Filed Nov. 3, 1922 7 Sheets-Sheet 4

Inventor
John W. Gordon
By [signature] Atty.

March 16, 1926. 1,577,224
J. W. GORDON
PHOTOGRAPHIC SURVEYING AND APPARATUS FOR USE IN CONNECTION THEREWITH
Filed Nov. 3, 1922 7 Sheets-Sheet 5
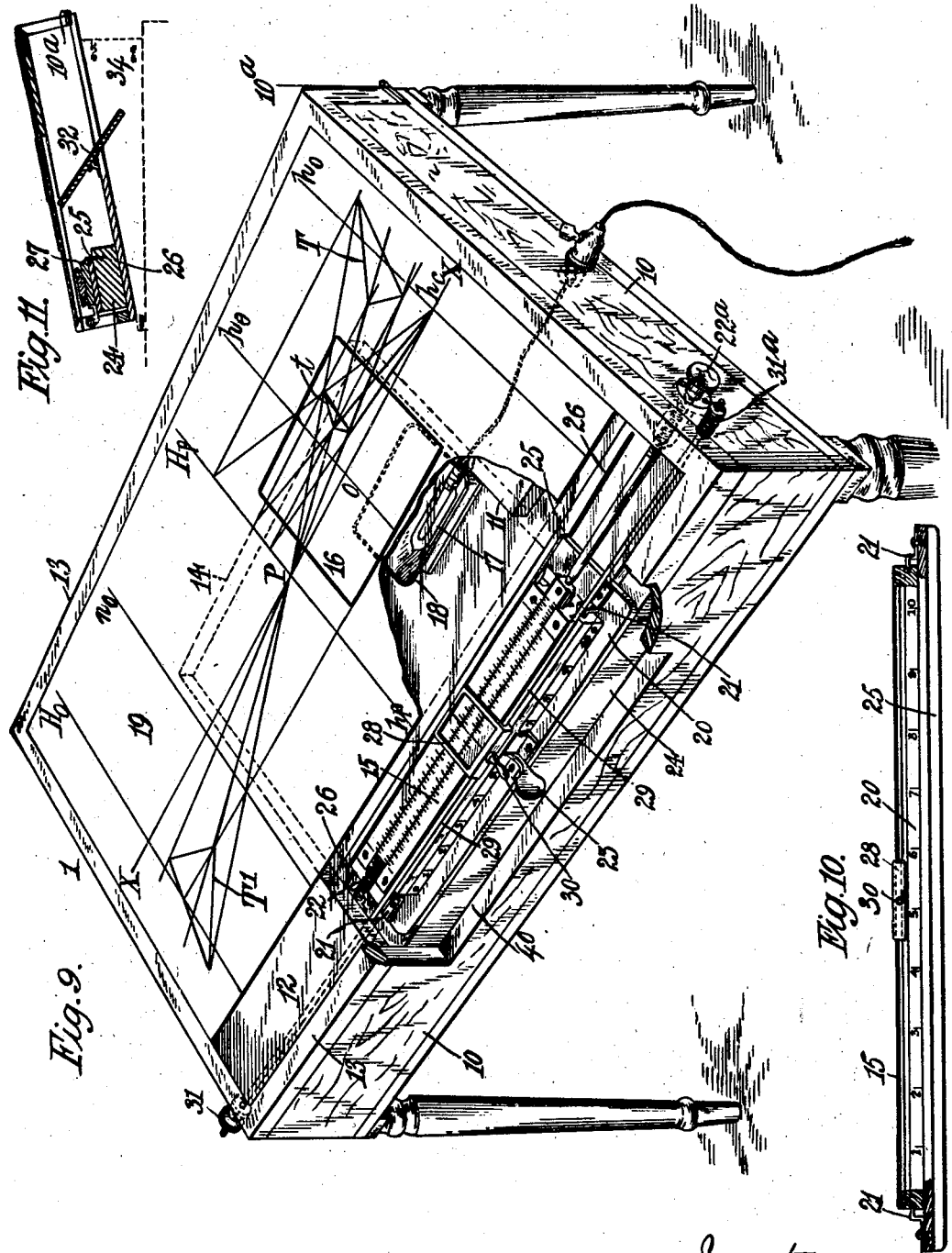

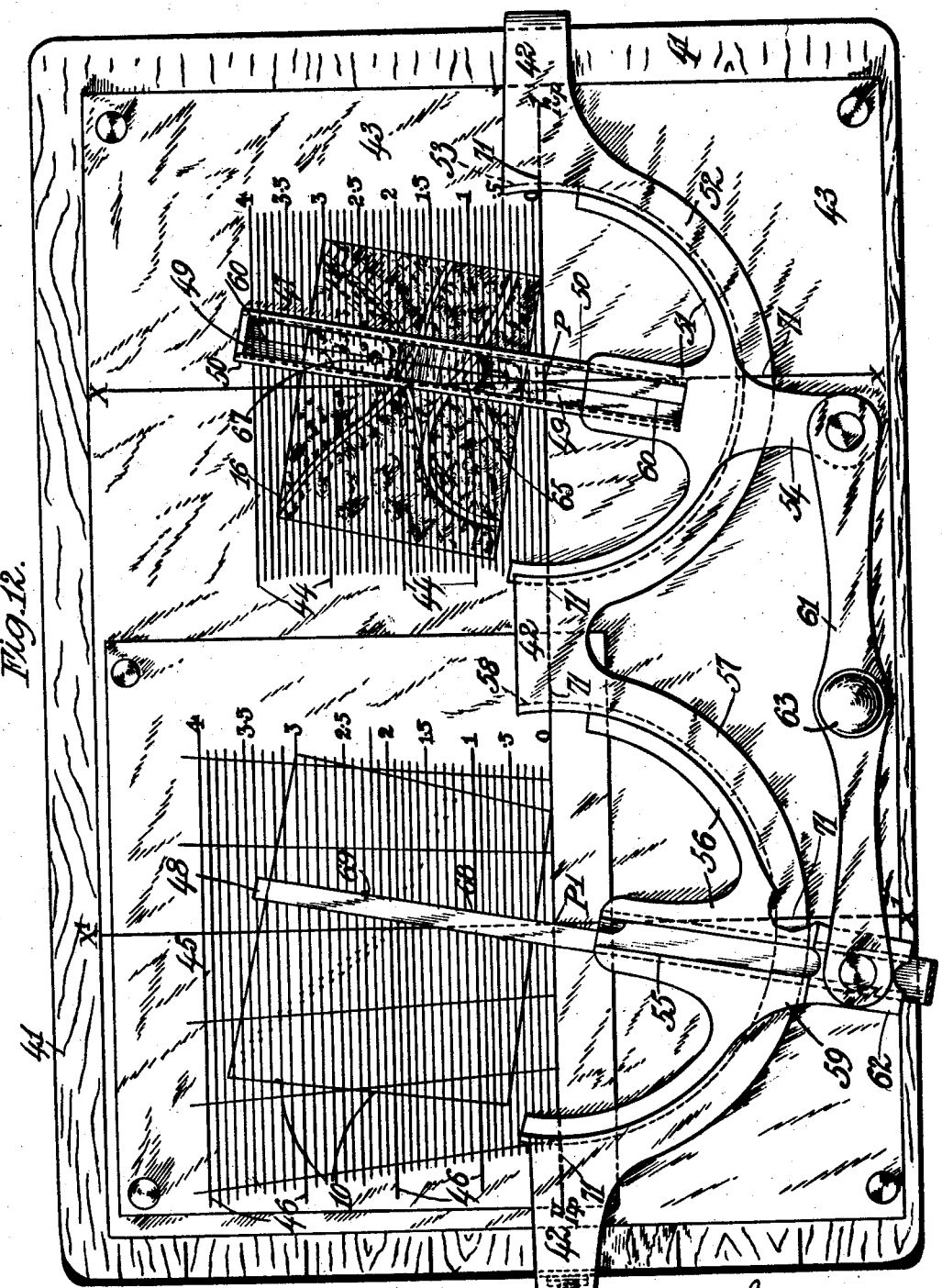

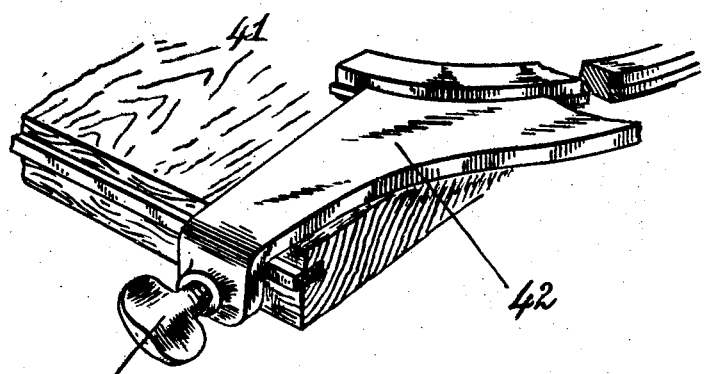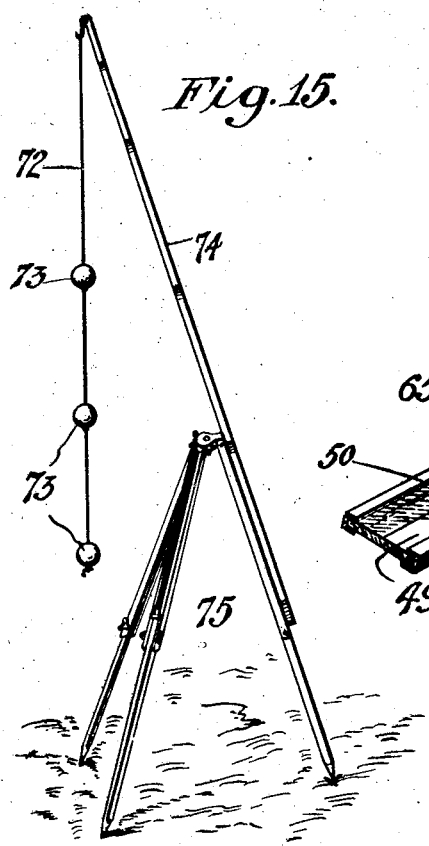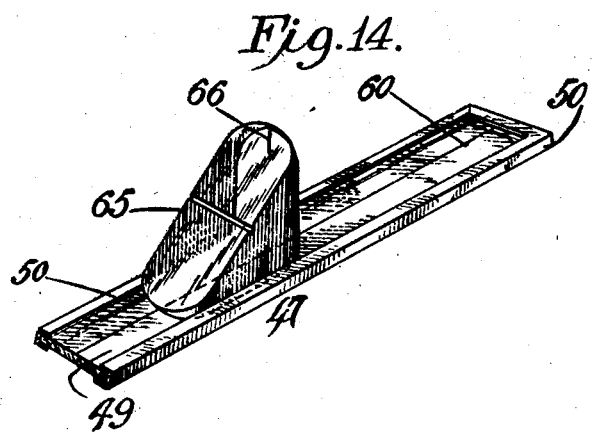

Patented Mar. 16, 1926.

1,577,224

UNITED STATES PATENT OFFICE.

JOHN WILLIAM GORDON, OF LONDON, ENGLAND.

PHOTOGRAPHIC SURVEYING AND APPARATUS FOR USE IN CONNECTION THEREWITH.

Application filed November 3, 1922. Serial No. 598,893.

*To all whom it may concern:*

Be it known that I, JOHN WILLIAM GORDON, a subject of the King of Great Britain, residing at 113 Broadhurst Gardens, Hampstead, London, England, have invented certain new and useful Improvements in or Relating to Photographic Surveying and Apparatus for Use in Connection Therewith, of which the following is a specification.

This invention relates to photographic surveying and may be said to comprise broadly a new and improved method of photographic survey which includes the plotting of plans from photographs by the aid of appliances or apparatus especially contrived for carrying such method into effect.

The invention is based upon what is believed to be a novel principle discovered as the result of a research made by me. It has been established that given the angle of inclination of the optical axis of the camera to the horizon and the focal length of the camera, it is possible to identify in the photographic plane and in the plane in which the survey is to be plotted, a certain central or basic point, hereinafter termed the field centre. By means of such centre, when the photograph has been accurately placed in the photographic plane, the correct positioning and delineating of the features of the photograph can be simply effected in the plotting plane.

A photograph to be used for the purposes of survey according to the present invention must be marked in such a way as to indicate the point at which the optical axis of the camera intersected the plane of the photograph during exposure. Such marking, more or less accurately carried out, has heretofore been used in the preparation of photographs and forms no part of this invention. It is referred to here in order that it may be clear to the reader that this point, herein called the optical centre of the photograph, is taken to be ascertained and that the more accurately it is known the more exactly can the photograph be fitted into its place on a plotting board and provided with what is hereinafter called a perspective diagram.

Knowing the optical centre of the photograph, and the focal length of the camera, it is possible, whether the horizon line appears in the photograph or not, to provide certain cardinal or basic lines on the photograph or photographic field, and with the information thus available, to place the photograph in proper position in the plotting plane and plot the survey from the photograph by the aid of the field centre.

The new and improved method according to this invention may be said to consist broadly in first photographing the area to be surveyed by means of a camera of accurately known focal length and identifying the optical centre of the photograph or of each photograph, and then providing on the photograph or photographs certain cardinal or basic lines which will enable the photograph or photographs to be placed in correct position on a plotting board which is suitably marked so that a plan or plans may be plotted from the photograph or photographs with reference to the field centre and in accordance with the rules and procedure hereinafter described.

The invention is particularly applicable for surveying by photographing from aircraft although it is also of importance in connection with other modes of surveying. For example, in surveying for railway sites, photographs may be taken from portable towers or masts and surveys plotted therefrom by the same rules and procedure as are adopted when photographs are taken from aircraft.

In order to enable the invention to be readily understood, reference is directed to the accompanying drawings, in which:—

Figure 1 is a diagram illustrating the general relation of the plan, photograph and ground to one another.

Figure 1$^a$ is another diagram embodying features of Figure 1, and illustrating how the positions of the various parallels, mentioned in connection with that figure, are determined.

Figure 1$^b$ is an explanatory diagram of what is herein termed the carto-photo-field, the diagram showing the field centre and various lines which are delineated or drawn in accordance with instructions hereinafter set out.

Figure 2 is a diagram illustrating one method by which the position of certain basic lines on the photograph may be ascertained.

Figure 3 is a diagram illustrating a modification of the method illustrated by Figure 2.

Figure 4 is an elementary representation of the plotting board.

Figure 5 is a diagram indicating the manner of placing a photograph in the photographic field and of the manner of plotting from the photograph.

Figure 6 is illustrative of a form of perspective diagram for use as hereinafter described for plotting or other purposes.

Figure 9 is a perspective view of a suitable form of plotting board, parts being broken away for the purpose of enabling the device to be clearly described.

Figure 10 is a view illustrating in part-sectional front elevation, the slide-rule shown in Figure 9, together with its carrier slide.

Figure 11 is a sectional view of a modified form of plotting board.

Figure 12 is a plan view of another form of plotting board.

Figure 13, is a perspective view of a detail of the plotting board shown in Figure 12.

Figure 14 is a perspective view of part of a radial arm and of a prism used in connection with the plotting board shown in Figure 12, and Figure 15 is a perspective view of a plumb-line beacon or base for use as hereinafter described.

Figure 7:
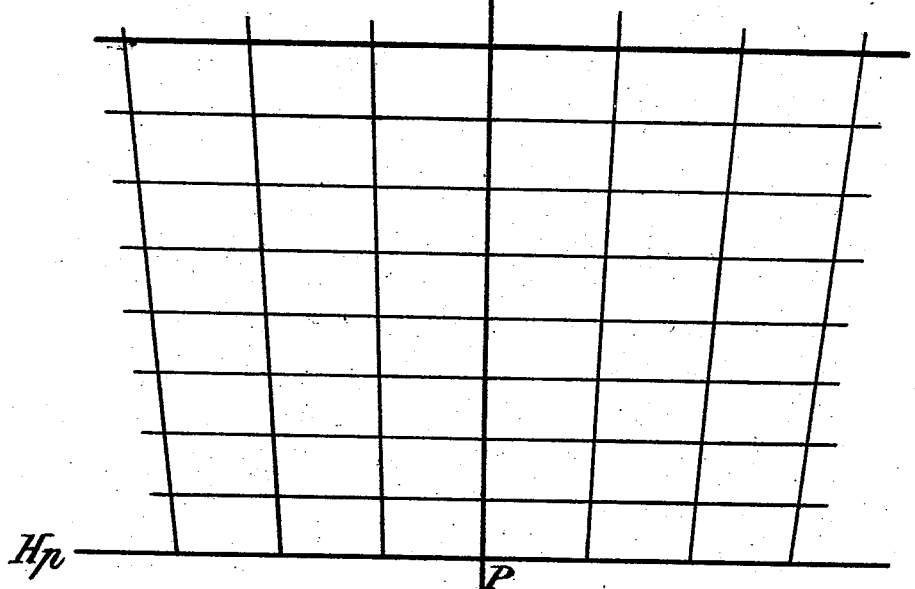
Figure 7 illustrates another form of perspective diagram.

In the following description, certain terms are used, and these, with their specific meanings, are as follows:—

(1) "Angle of dip" or "dip angle" means the angle at which the optical axis of the camera is inclined to the horizontal at the time of exposure. This angle, when embodied in any of the following formulæ, is denoted by the symbol $\theta$.

(2) "Photographic field" designates a plane having a terminal edge which coincides with the horizon of the photograph—whether included in the photograph itself or not—in which plane the surface of the photographic plate or negative lies during exposure. In all directions except along this horizon edge, the photographic field is taken to be extended indefinitely.

(3) "Cartographic field" is a plane in which the plan plotted from the photograph is delineated. The cartographic field is bounded along one edge, parallel with the horizon edge of the photographic field, by a line, which will be hereinafter called its margin line. In all other directions it is taken to be extended indefinitely. For a space equal to $2(\sec \theta)F$, measured at right angles to the margin, if the two fields are made coplanar, the cartographic field coincides with the photographic field, the symbol F signifying the focal length of the photographic camera. When both the cartographic and the photographic fields are represented in the same plane, as they may be in the present system, then the two fields are together called the carto-photo-field.

(4) "Parameter", as the term is used in this specification, signifies one half of the distance between the horizon and margin lines in the carto-photo-field and will be denoted hereinafter by the symbol $p$. The value of the parameter is therefore:—

$$p = (\sec \theta)F \quad (1)$$

The use of the parameter, $(\sec \theta)F$, in photographic land survey and its value for the purposes thereof are a subject of my discovery as above referred to, and constitute, according to my information and belief, a body of scientific facts hitherto unknown.

(5) "Pharameter parallel" signifies a line parallel to the horizon and margin lines and drawn in the carto-photo-field at a distance equal to $(\sec \theta)F$ from the horizon and margin parallels respectively.

(6) "Field centre" is the central point of the parameter parallel and is therefore the central point of the carto-photo-field. This field centre is of importance, and its identification and exploitation form essential features of the present invention.

(7) "Prime parallel" is a line drawn parallel to the parameter parallel on the horizon side thereof. Its distance from the parameter parallel when drawn in the photographic field is $$x\theta = (\sec \theta - \tan \theta)F \quad (2)$$

the symbol $x\theta$ being used to denote the distance so defined. The distance between the parameter parallel and the prime parallel in the cartographic field is $$X\theta = \sec \theta (\operatorname{cosec} \theta - 1)F \quad (3)$$

the distance $X\theta$ in the cartographic field being conjugate, in the sense hereinafter defined, to the distance $x\theta$ in the photographic field.

(8) "Nadir parallel" is a line drawn in the photographic field parallel to the parameter parallel on the side thereof remote from the horizon and distant from the parameter parallel by a length equal to $$x_n = \sec \theta (\operatorname{cosec} \theta - 1)F \quad (4)$$

(9) "Air foot parallel" is a line drawn in the cartographic field at a distance from the parameter parallel on the margin side equal to $$X_A = (\sec \theta - \tan \theta)F \quad (5)$$

The air foot parallel in the cartographic field is conjugate to the nadir parallel in the photographic field.

(10) The "prime meridian" is a line drawn through the field centre at right angles to the parameter parallel and continued indefinitely (that is to say, so far as may be necessary for any practical purpose), across both the cartographic and photographic fields.

A given point or line in the photographic field is herein said to be conjugate to another given point or line in the cartographic field—and vice versa—when the two given points or lines are so situated in their respective fields that the one is the perspective or the counter-perspective of the other.

The definitions given in the preceding paragraphs (1) to (10) are illustrated diagrammatically by Figures 1, 1ª and 1ᵇ of the drawings.

In Figure 1, the condition of affairs when taking an aerial photograph is diagrammatically reproduced. Here C is a photographic camera having the nodal point of its lens at S and a focal length of S ... N. Its optical axis is projected along the line N S S² making, with the horizontal or ground plane, the angle $\theta$ which is the "angle of dip" or "dip angle" aforesaid. The line S ... $h_o$ is traced in the plane of the horizon, which plane may be taken as being parallel to the ground plane, assuming the latter to be truly horizontal. The line S ... G is the vertical from the point S to the ground. It stands perpendicular to the ground plane and its length represents the height of the nodal point of the camera from the ground at the time the photograph is taken. For the purpose of illustration, a photographic plate is shown in the camera by the cross-hatched part $n$ and the field of vision of the camera is shown bounded by the rays $f \ldots f'$ and $f^2 \ldots f^3$. It will be seen that the area of ground reproduced on the phonographic negative will lie between $f'$ and $f^3$, and if it now be assumed conversely, that the reproduced features of that area of ground are projected from the camera within the bounds of the same rays $f \ldots f'$ and $f^2 \ldots f^3$, it will be understood that the projected outline of such features on any plane parallel to the ground plane and lying intermediate between the ground and the horizon plane, will be a true reproduction, on a smaller scale, of the features of that area of ground. As a matter of fact, a map or plan may be said to conform with a similarly projected reproduction of the actual ground features upon some such intermediate plane.

In the present invention the map or plan is made to correspond with such a reproduction on a plane situated at a distance S ... A, equal to the focal length S ... N, vertically below the nodal point of the camera, and this plane will be hereinafter referred to as the reference plane.

Now, as is well known, the image obtained on a photographic negative is the reverse of the actual object photographed. But if a plane be taken, which lies parallel to the sensitive plate $n$ mounted in the camera behind the lens, and distant from the nodal point S on the opposite or front side thereof by an interval equal to the focal length S ... N, it is evident that the projection onto such a plane of the features of the negative, will be a fac-simile of the negative, but unreversed with respect to the actual lay of the ground. Such a plane is shown in Figure 1, and it will be hereinafter termed the perspective plane.

There are thus identified the perspective plane and the reference plane, and for the purposes of this invention they may, respectively, be taken as representing the photographic plane and plotting plane, or, in other words, the photographic and cartographic fields above defined.

As will be seen from Figure 1, the photographic field, for the purposes of land surveying, may be taken as terminating in one direction, at the horizon plane, that is along a line extending at right angles to the plane of the paper from $h_o$. This line is the horizon edge of the photographic field as above referred to, and it will be hereinafter designated the horizon line $h_o$.

Upon further reference to Figure 1, and assuming an imaginary lens angle of 180°, which would be the theoretical limit, it will be observed that the cartographic field also has a terminal edge in one direction situated along the line of intersection of the reference plane with the plane of the lens represented by the line S ... H$_o$. This terminal edge is the margin line of the cartographic field as above referred to, and it will be hereinafter designated the margin line or parallel H$_o$.

Figure 1 also shows that the perspective plane and the reference plane intersect each other along a line doubly marked by H$_p$ and $h_p$. This line is the parameter parallel of the carto-photo field as above mentioned, and it will be hereinafter referred to as the parameter parallel H$_p$ ... $h_p$. Other parallels above defined are also capable of identification by assuming that the line S ... G and the optical axis N S S² represent planes lying at right angles to the plane of the paper. Thus where the vertical plane containing the line S ... G intersects the reference and perspective planes respectively, the airfoot parallel A of the cartographic field and the nadir parallel $n_o$ of the photographic field are obtained, while by the intersection of the plane of the optical axis with the perspective and reference planes, the prime parallel $h\theta$ of the photographic field and the prime parallel H$\theta$ of the cartographic field are respectively obtained. It will be readily understood that the parallels A and $n_o$, $h\theta$ and $H\theta$ are conjugate to each other in the sense above described.

If it now be assumed that a vertical plane exists lying in or parallel to the plane of the paper and containing the optical axis N S $S^2$, two further lines are obtained where this plane intersects the reference and perspective planes respectively. When, for the purposes of this invention, the photographic and cartographic fields are made co-planar as stated above, and as will be described hereinafter in connection with Figure 1$^b$, these two lines of intersection coincide, and as thus regarded they together form the prime meridian above referred to and marked X P X in Figure 1$^b$. The central points where these two lines of intersection cut the parameter and prime parallels, give, in the case of the photographic field, the optical centre of the photograph seen at O in Figure 1$^b$, and in the case of both the photographic and cartographic fields, the field centre which is seen at P in Figure 1$^b$.

Having thus identified the different base lines employed in the present system of surveying, their positions with respect to each other will now be definitely defined and ascertained. For this purpose, reference is directed to the diagram shown in Figure 1$^a$, which really is a simplification, on a larger scale, of the upper part of Figure 1. For the sake of convenience, however, the diagram is assumed to be a purely trigonometrical figure principally obtained by the intersection with each other of the several planes (excepting the ground plane) mentioned in connection with Figure 1. For this reason the points $h_p$ ($H_p$), $h\theta$ and $h_o$ are replaced by P, O and $h_c$ respectively, the points P and O having been mentioned above and the point $h_c$ being the principal vanishing point of the perspective plane of the photograph, and all three points lying in the vertical plane aforesaid containing the optical axis here shown by the line S S$^1$.

The distance $H_o \ldots P$ is, as appears from the diagram, equal to the distance $h_c \ldots P$ and is called the parameter of the photograph hereinbefore referred to by the symbol $p$. It is further obvious from the diagram that the distances $S \ldots H_o$, $S \ldots h_c$, $H_o \ldots P$ and $h_c \ldots P$ are all equal to one another and are therefore equal severally to the parameter of the photograph. Utilizing the symbol F now for the focal length of the camera (and both $S \ldots A$ and $S \ldots O$ are equal to F) it will be obvious that the parameter is equal to (sec $\theta$) F, thus proving equation (1) above. It is also obvious that the horizon distance $O \ldots h_c$ of the optical center O is equal to (tan $\theta$) F and that the nadir distance $O \ldots n_o$ of the optical center O is (cot $\theta$) F. Moreover, it is readily ascertainable that the distance $P \ldots O$ between the parameter parallel and the prime parallel in the photographic field is equal to (sec $\theta$ — tan $\theta$) F, thus proving equation (2) above. Proceeding from this, it may be calculated that the distance $P \ldots S^1$ between the parameter parallel and prime parallel in the cartographic field and the distance $P \ldots n_o$ between the parameter parallel and the nadir parallel in the photographic field is equal to sec $\theta$ (cosec $\theta$ — 1) F, thus proving equations (3) and (4). Equation (5) for finding the distance $P \ldots A$ in the cartographic field between the parameter and airfoot parallels is similar to equation (2) and may be proved by the similarity of the triangles S A P and S O P.

It will be obvious from the diagrams in Figures 1 and 1$^a$ that the margin distance $A \ldots H_o$ of the airfoot parallel in the cartographic field is equal to the horizon distance $O \ldots h_c$ of the prime parallel in the photographic field; that the margin distance $P \ldots H_o$ of the parameter parallel in the cartographic field is equal to its horizon distance $P \ldots h_c$ in the photographic field and that this common distance is equal to the parameter as above defined; and that the margin distance $S^1 \ldots H_o$ of the prime parallel of the reference plane is equal to the horizon distance $n_o \ldots h_c$ of the nadir parallel in the perspective plane. It is upon these relations between the reference plane and perspective field and the resulting connection of plan and photograph that this system of land surveying by photography is based.

It will now be opportune to describe Figure 1$^b$, and for this purpose reference is redirected to Figure 1. From the latter figure it will be seen that along the parameter parallel or the line where the perspective and reference planes intersection at $H_p$ $h_p$, all distances will be the same in the two planes. This line may be regarded as an axis, and if it be assumed that the perspective plane be turned about this axis in the direction of the small arrows, it will readily be seen that the one plane can be brought into coincidence with the other, or in other words that the photographic and cartographic fields may be made co-planar, while the parameter parallel may be taken as a base line to which reference may be made in connection with both the photographic and cartographic fields because distances along it are common in the two fields. This co-planar state of affairs is represented in Figure 1$^b$, but for the sake of convenience only one part of each field is assumed to be shown, the one above the prime meridian X P X and the other below that meridian. The figure is thus divided longitudinally by the prime XPX, and in the upper half of the figure the cartographic field and its parallels are represented, while in the lower half the photographic field and its parallels are shown, it being understood that both fields extend indefinitely both above and below the prime meridian. P is the field centre, O is the optical center, the line $H_o$ is the margin parallel, the line A is the air foot parallel, and the line $H_p \ldots h_p$, common to the two fields, is the parameter parallel. The line $H\theta$ is the prime parallel of the cartographic field. In the photographic field the line $h_o$ is the horizon line, the line $h\theta$ is the prime parallel and the line $n_o$ is the nadir parallel. The representation of the two fields in one plane is of great practical convenience in the plotting of plans from photographs by the present method of surveying, as will be apparent from the methods of plotting hereinafter described.

Of the lines above identified in the photographic field, it never happens that all four can be identified in the photograph itself, for the angular distance between the horizon line and the nadir parallel is too great for any known type of photographic camera. The only line which can always be identified is the prime parallel, the position of which can be established by the criterion that it passes through the optical centre and is parallel to the horizon line. The optical centre may be taken to be known, being identified by the fiducial marking already referred to above, so that it remains to identify only the direction of the horizon line. The latter, however, may not appear in the photograph, but nevertheless a line parallel to the horizon line can be identified if certain fiducial points can be ascertained in the photograph. The present invention enables these points to be ascertained and this being the case it is possible to define the prime parallel. Such fiducial points may be: (1) Six points, being the terminal and dividing points of two straight lines in a horizontal plane shown in perspective in the photograph or (2) six such points in two straight lines, lying in a vertical plane parallel to the line of the horizon and shown in perspective in the photograph or (3) four points, being the corner points of a quadrilateral figure traced on a horizontal plane or (4) on a vertical plane parallel to the line of the horizon in the object space, the points in both cases being shown in perspective in the photograph or (5) three such points lying in a vertical or a plumb line in the object space and shown in perspective in the photograph. In any case it is to be assumed that the proportions are known in which the given line or lines in the object space are divided. Let the line on the actual object be denoted by $a+b$, the segments $a$ and $b$ being the parts into which the given line is divided and let $A+B$ be the measure of its perspective in the photograph, A being the back ground and B the foreground segment corresponding to $a$ and $b$ on the object respectively. Then the four measurements $a$, $b$, A and B are known quantities, from which a fifth quantity C can be computed by the equation:

$$C = \frac{(a+b)AB}{aB - bA} \quad (6)$$

The quantity C represents the distance between the points where the line in the photograph is divided and a fiducial point situated where a prolongation of the line terminates in a line lying, as aforesaid, parallel to the horizon line.

The equation (6) enables the surveyor to determine the direction of the prime parallel across the photograph in which the fiducial points, above mentioned, have been identified. Its application to this purpose in connection with case (1) above, is illustrated by Figure 2 of the accompanying drawings. In this Figure X Y Z, and $X^1$ $Y^1$ $Z^1$ represent terminal and dividing points in two straight lines lying in a horizontal plane in the object space, the length $Z \ldots Y$ being equal to $a$, the length $Y \ldots X$ being equal to $b$, the length $Z^1 \ldots Y^1$ being equal to $a^1$ and the length $Y^1 \ldots X^1$ being equal to $b^1$. The lines $x\ y\ z$ and $x^1\ y^1\ z^1$ are assumed to indicate the perspectives in the given photograph of these object lines, the length $z \ldots y$ being equal to A, the length $y \ldots x$ being equal to B, the length $z^1 \ldots y^1$ being equal to $A^1$ and the length $y^1 \ldots x^1$ being equal to $B^1$. Then, by equation (6) we can derive two values of C from these data, that is to say:

$$C = \frac{(a+b)AB}{aB - bA}$$

and $$C^1 = \frac{(a^1+b^1)A^1B^1}{a^1B^1 - b^1A^1}$$

If now, we draw through the point $z$ a line $y \ldots w$ of a length $v$ and through the point $z^1$ a line $y^1 \ldots w^1$ of a length $v^1$, so proportioned to each other that $v:v^1 :: C:C^1$, and if through the two points $w$ and $w^1$ thus obtained we draw a straight line, the line so drawn will be parallel to the horizon line, and the prime parallel may be traced on the photograph by drawing a line through the optical centre parallel to $w \ldots w^1$, as will be readily understood. Having thus ascertained the position of the prime parallel, the prime meridian may be delineated on the photograph by means of a line drawn at right angles to the prime parallel through the optical centre.

In the second case, in which the two divided lines lie in a vertical plane parallel to the line of the horizon, the equation (6) will yield a negative value for C, and the lines $y \ldots w$, $y^1 \ldots w^1$ will then be drawn, not through the points $z\ z^1$, but through the points $x\ x^1$, towards the foreground of the photograph, having vanishing points in the nadir parallel.

The third case is illustrated by Figure 3 of the drawings, in which $X\ Z^1\ Z\ X^1$ represents a quadrilateral on a horizontal plane in the object space and $x\ z^1\ z\ x^1$ is assumed to show its perspective in the photograph. Let the diagonals $X\ Z$, $X^1\ Z^1$, $x\ z$ and $x^1\ z^1$ be drawn in this figure intersecting in $Y$ and $y$ respectively. Also, let $Y \ldots Z = a$, $Y \ldots X = b$, $y \ldots z = A$ and $y \ldots x = B$, and let $Y \ldots Z^1 = a^1$, $Y \ldots X^1 = b^1$, $y \ldots z^1 = A^1$ and $y \ldots x^1 = B^1$. Then the line $w \ldots w^1$ may be found on the background side of the point $y$ by means of equation (6) as in case (1). If the quadrilateral stands in a vertical plane in the object space as in case (4), then the line $w \ldots w^1$ is to be found on the foreground side of the point $y$, as in case (2).

Lastly, in the fifth case, wherein a divided vertical or plumb line is used, the equation (6) has a special significance, because the quantity C represents a distance $v$ which, if set off from the dividing point $y$ in the photographic representation of the line in a manner similar to that above described, yields a point $w$ lying in or beyond the foreground of the photograph, which may be identified with the central point of the nadir parallel in which that parallel is intersected by the prime meridian. The point $w$ therefore, is in this case a second point given on the prime meridian (the other point being the optical centre) so that by passing a line through it and through the optical centre, the prime meridian can be drawn in the photograph. When the prime meridian is known, the prime parallel may be traced in the photograph by being drawn at right angles to it through the optical centre. In the case of a vertical divided line, or divided plumb line it will generally be easy to arrange the division so that the two segments $a$ and $b$ shall be equal to one another. In that case equation (6) takes the simplified form $$C = \frac{2AB}{B-A} \quad (7)$$

In the case last discussed, namely, that of the vertical divided line, the position of the prime parallel was determined by drawing it at right angles to the prime meridian and through the optical centre. If the position of the prime parallel is known independently, that of the prime meridian can be determined by the reciprocal rule that it lies at right angles to the prime parallel and also passes through the optical centre. The foregoing rules suffice, therefore, for the identification of both prime meridian and prime parallel in a given photograph.

A suitable construction of plumb-line beacon or base will be hereinafter described with reference to Figure 15 of the drawings.

When the prime meridian and prime parallel can be identified in a photograph, that photograph can be located in the photographic field, for the prime meridian of the photograph must coincide with the axis of the photographic field, and the optical centre of the photograph with the point in which the prime meridian and prime parallel of the photographic field intersect one another.

In connection with this invention it has been discovered that when a photograph is correctly located in the photographic field, certain simple operations suffice to identify or plot the points in the cartographic field conjugate to any given points in the photograph representing points in the object space which lie at any given datum level. The method of thus plotting plans from photographs will be described with reference to Figures 4 and 5 of the drawings. The device herein referred to as a plotting board is a drawing board especially fitted and designed for carrying out this work. Detailed representations of suitable plotting boards will be described hereinafter with reference to Figures 9, 10, 11, 12, 13 and 14 of the drawings. In Figure 4, the plotting board is indicated by the reference numeral 1. Upon the board are traced the two lines $XPX$ and $H_p$—$h_p$, at right angles to each other and intersecting in the point P, to serve as prime meridian and parameter parallel respectively of the co-planer photographic and cartographic fields hereinbefore termed the carto-photo-field. At a distance from the parameter parallel, determined in accordance with equation (2) above, the line $h\theta \ldots h\theta$ is drawn parallel to $H_p$—$h_p$ and serves as the prime parallel of the photographic field. The point O in which this line is intersected by the prime meridian is the optical centre of the photographic field. Upon the drawing board so demarcated, the photograph from which the plan is to be made is mounted, the optical centre of the photograph being made to coincide with the optical centre of the photographic field, and the prime meridian of the photograph with the field axis $XPX$. A drawing board so demarcated and with a properly dimensioned photograph thus mounted upon it constitutes what is herein termed a plotting board.

The method of plotting with this appliance will now be described with reference to Figure 5 of the drawings. In this figure, the prime parallel has been omitted for the sake of clearness but, on the other hand the horizon line $h_o$ with its principal or central vanishing point at $h_c$ has been introduced. In this diagram, the photograph is indicated in outline at 2, it being assumed that it has been duly placed in position in accordance with the directions hereinbefore given. The point $k$ is a point in the photograph which it is required to plot upon the plan. Its conjugate point K is found by the following construction. Through the points $h_c$ and $k$ a straight line is drawn and prolonged until it meets the parameter parallel in $k_p$. From $k_p$ the line $k_p \ldots K$ is drawn parallel to the field axis XPX. Next through the field centre P and the point $k$ a line is drawn and continued until it meets the line $k_p \ldots K$ in the point K. Then the point K is the conjugate point in the cartographic field to the point $k$ in the photographic field.

Algebraically, the point K may be found by the following equation: Let the distance in the photographic field between the points P and $k$ be denoted by $r$ and the distance in the cartographic field between P and K be denoted by R. Then:—

$$R = \frac{pr}{p-x} \quad (8)$$

where $p$ has the value above assigned to it, i. e. $p = \sec \theta F$ and $x$ is the abscissa when the point $k$ is defined by rectangular co-ordinates having the field centre P for origin and the prime meridian and parameter parallel for axes of abscissæ and ordinates respectively. Thus it will be seen that conjugate points in the photograph and on the plan may be identified by the fact that given a point in the photograph situated at the radial distance $r$ from the field centre taken for the origin of polar co-ordinates, its conjugate point may be found upon the plan by following that radius for a distance equal to R from the same central point, namely from the field centre.

It is obvious from Figure 5 that the point $K_1$ will, equally with the point K, satisfy equation (8) so that $K_1$ is a second conjugate point to the given point $k$, but is situated in the quadrant diagonally opposite to that in which the point K is situated. It will also be obvious that two other similarly conjugate points could be found, one in each of the remaining quadrants. Thus four conjugate points can be identified in this way as conjugate to the point $k$, which correspond to four different methods of plotting from the given photograph. According as one or other of these four methods is adopted and systematically applied to the plotting of the photograph, the resulting plan will be oriented in one or other of four different ways; that is to say, the plan in its position on the plotting board will, in the first described case, be oriented in the same way as the photograph, while in the other three cases referred to, it will be (2) reversed right for left, or (3) reversed top for bottom, or (4) reversed completely. The plans here referred to as cases (1) and (4) are indistinguishable after removal from the plotting board. The semi-reversed plans (2) and (3) correspond to these as a mirror picture answers its original.

Now the plotting of a plan with numerous details point by point from a photograph in the above manner is a tedious process, so that it is desirable to lessen the labour. This can be done by fitting to the photograph, a diagram representing its perspective system, by means of which distances shown in perspective in the photograph may be measured as on a plan. Such a perspective diagram is shown in Figure 6 of the drawings, and its construction will now be described. The lines $h\theta$ and $h_p$ in Figure 6 represent the prime parallel and parameter parallel respectively of the photographic field. On the parameter parallel certain points $h_{p1}$, $h_{p2} \ldots h_{p7}$ etc., are set off at equal distances from one another, of which one, the point $h_{p4}$ in the figure, coincides with the field centre P. A corresponding series of points $h\theta_1$, $h\theta_2 \ldots h\theta_7$ is set off on the prime parallel, the point $h\theta_4$, which corresponds to $h_{p4}$, coinciding with the optical centre denoted by the letter O in the figure. The common distance between the points $h\theta_1$ etc. is proportioned to the common distance between the points $h_{p1}$ etc. according to the following equation in which $\Delta\theta$ is the common distance measured on the prime parallel, and $\Delta p$ is the common distance on the parameter parallel; that is to say:

$$\Delta\theta/\Delta p = \sin \theta \quad (9)$$

Lines drawn through the points so determined converge as shown on the figure, and will meet in the principal vanishing point on the horizon line. These lines will serve as meridians of the proposed perspective diagram. If, across the diagram so provided with meridians, other lines are drawn parallel to the prime and parameter parallels and at such distances from one another that they constitute an harmonic series, as shown in the figure, the diagram so subdivided into trapezoids will plot, if treated as hereinbefore described on a plotting board, as an area divided into rectangular parallelograms all of uniform size and shape. The proportions of these rectangular parallelograms will depend upon the proportions of these trapezoids. The relation between them is given by the following rule:—

Let it be required to divide the perspective diagram into trapezoids each representing a rectangle of the dimensions say, of the rectangle $h_{p4}$, $h_{44}$, $h_{55}$, $h_{p5}$ of Figure 6. From the corner point $h_{p4}$ of that rectangle draw the diagonal $h_{p4} \ldots h_{55}$ and let the angle which it makes with the parameter parallel be denoted by $a$. Also through the optical centre draw a line $3 \ldots 3$ traversing the perspective diagram from side to side and let the angle which that line makes with the prime parallel be denoted by $\alpha$. Then the angles $a$ and $\alpha$ are related by the following equation:—

$$\frac{\tan a}{\tan \alpha} = \sin \theta \quad (10)$$

In the common case in which trapezoids in the perspective diagram represents squares in the plan, we have $\tan a = 1$, and therefore for this purpose:—

$$\tan \alpha = \sin \theta \quad (11)$$

Where the diagonal line so drawn through the optical centre intersects the meridians, parallels are to be drawn, as in the figure, and the diagram will be so completed for the space above and below the prime parallel over which the diagonal extends. If it is required to extend the diagram beyond these limits, the further subdivisions may be effected, as shown in figure, by means of a subordinate diagonal $4 \ldots 4$ or subordinate diagonals should more than one be necessary. Such subordinate diagonals are positioned by drawing them diagonally through one or more trapezoids already formed, and may be prolonged into the region not traversed by the principal diagonal $3 \ldots 3$, determining by their intersections with meridians, the points through which additional parallels must be drawn. In this way, a photograph, of whatever dimensions, may be fitted with a perspective diagram adapted to facilitate the plotting of a plan from the photograph.

A perspective diagram prepared in the foregoing manner is adapted to measure objects in the photograph lying in a horizontal plane at some given distance below the nodal point of the camera. This distance, which may be called the altitude of the camera station, is given by the following equation:

$$\text{Altitude} = (m+1)F \quad (12)$$

wherein $\frac{1}{m}$ is the scale upon which the plan, plotted as hereinbefore described, will be produced and F is the principal focal length of the lens employed.

If F is regarded as the focal length of the camera, the equation is modified as follows:—

$$\text{Altitude} = mF \quad (12_a)$$

Hence, the focal length of the camera being known, it is possible to design the perspective diagram for a given level below the nodal point of the camera in which the photographic plate is exposed and in the case of undulating ground or of ground which is otherwise inclined, perspective diagrams can be produced suitable for different contour levels of the ground. If two photographs are taken of the same ground and are plotted by the aid of perspective diagrams constructed for the same contour level, the objects lying at that contour level will present the same appearance in the two plans, but objects lying either above or below that contour level will be unequally displaced by reason of excessive or defective parallax and will, by the irregularity of their displacement, be distinguishable, on a comparison of the two plans.

In determining the contour level for which a given perspective diagram is constructed, regard is to be had to the dimensions of the divisions $\Delta p$ of the parameter parallel as above defined. The scale of these divisions being taken to be equal to $1/m$, equal, that is, to the scale of the resulting plan produced from the photograph, the scale in any other part of the photograph may be determined thereby, it being proportional to the scale of the trapezoid, as hereinbefore defined, in the region in question of the photograph. Hence if it is desired to prepare perspective diagrams for two or more contour levels in the same photograph, such diagrams may be prepared by the rules hereinbefore given, the magnitudes of the several parameter parallel divisions, $(\Delta p)$, being made inversely proportional to $m$, the altitudes $mF$ being the altitudes corresponding to those various contour levels respectively.

The perspective diagram constructed as shown in and described with reference to Figure 6, is specifically adapted to be fitted or applied to a photograph, the trapezoids into which it is divided corresponding to as many equal rectangular parallelograms upon the plan. If, however, instead of dividing the photographic field harmonically, as in Figure 6, such field be divided equably into rectangular parallelograms, that is to say by two sets of evenly spaced parallels drawn at right angles to the prime meridian and prime parallel respectively, it will be found that the division of the plan by conjugate lines satisfying, point by point, the equation (8) will yield an harmonical subdivision of the cartographic field as indicated in Figure 7. In this figure, the prime meridian is shown at XPX and the parameter parallel of the cartographic field at $H_p$. It will sometimes be found convenient to adopt this alternative form of perspective diagram for coordinating the photograph and its plan upon the plotting board, because in most cases the divisions of the plan, being on a larger scale than those of the photograph, can be drawn more accurately than these latter, while the harmonical divisions, being more difficult to draw than the uniform divisions, may with advantage be drawn upon the larger scale.

Very commonly the unit $\Delta p$ will represent such a unit as a foot, a metre, a chain, a kilometre, etc. on the ground, but for the purpose of contouring a photograph it is very useful to construct a perspective diagram upon the basis of a unit which will for brevity be called a parallact. By a parallact is meant a value for the unit $\Delta p$ as above defined, such that $\Delta p$ is made equal to the projection, on the parameter parallel of the photographic field, of the reduced distance (that is to say, the distance measured parallel to the parameter parallel) between the two camera stations from which two photographs, compared for contour, have been obtained. In other words, if $\mathcal{L}$ be written to denote the reduced distance between the camera stations, then:—

$$\Delta p = \mathcal{L}/m \quad (13)$$

When this equation is satisfied, the magnitude $\Delta p$ or a proportionate length on any other parallel in the diagram is herein termed a parallact and a perspective diagram constructed on the basis of the parallact $\Delta p$ is called a parallacter diagram.

If parallacter diagrams be constructed for two photographs of the same ground and the photographs be compared by means of these diagrams, it will be found that points on the level for which the two diagrams are constructed will appear to be displaced by parallax to the extent of one parallact; that points lying at a lower level appear displaced by less than a parallact and that points raised above that datum contour appear displaced by more than a parallact. It will be found moreover that the displacement so observable is inversely proportional to the altitude of the camera station above the level of the displaced point so that this observation may be used to determine contour levels in a doubly photographed area. The proportion just mentioned is not simple inverse proportion but compound inverse proportion expressed by the equation:

$$\frac{C}{mF} = 1 - \frac{\sigma c}{\sigma o} \quad (14)$$

where
$C$ = the height above, or depth below, datum level of the contoured point.
$mF$ = the height above datum level of the nodal point of the camera.
$\sigma c$ = a parallact as above defined, and
$\sigma o$ = the observed parallactic displacement.

Equation (14) applies only to the case of a parallactic displacement measured parallel to the prime parallel of the photograph. If the parallactic displacement be at right angles to the prime parallel, the equation must be modified by writing it thus:

$$\frac{C}{mF} = 1 - \frac{Sc}{So} \quad (15)$$

where $Sc$ is equal to the displacement which a given point when plotted in the two plans made from two photographs respectively, would undergo if situated in the datum level, and $So$ is equal to the displacement of the said point observed upon a comparison of the two plans.

The equation in the form $$\frac{C}{mF} = 1 - \frac{Sc}{So}$$

is of general validity and holds good along whatever axis the parallactic displacement takes place, whereas in the form $$\frac{C}{mF} = 1 - \frac{\sigma c}{\sigma o},$$

in which the magnitude $\sigma c$ and $\sigma o$ and directly measurable in the photograph itself, it holds good only when the axis, along which the measurements are made, is parallel to the prime parallel.

Figure 8:
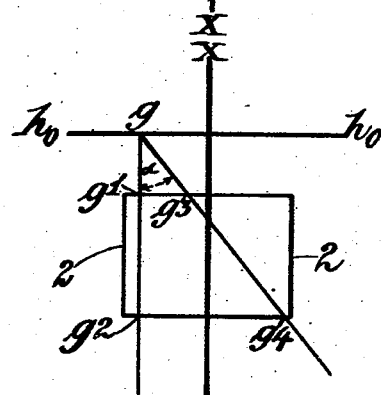
Figure 8 is a diagram illustrating what is hereinafter termed a parallacter diagram.

Now a parallacter diagram for use in contouring photographs may be of very simple construction as will now be described with reference to Figure 8. In this figure a photograph is shown in outline at 2, and the horizon line $h_0 \ldots h_0$ is shown outside the photograph itself. Through a point $g$, which may be arbitrarily chosen in the horizon line, a line parallel to the prime meridian $X \ldots X$ and herein termed a meridian line, is drawn crossing the photograph 2 from $g^1$ to $g^2$. At an angle $a$ to the meridian line, which angle may be called the parallacter angle, a second line, herein termed a parallacter line, is drawn intersecting the horizon line in the same point $g$ and crossing the photograph 2 from $g^3$ to $g^4$. The parallacter angle may now be defined. The angle is of such magnitude that the parallacter line, if prolonged as far as the parameter parallel of the photographic field, will at its point of intersection with that parallel be distant from the point of intersection of the meridian line with the same parallel, by a length equal to the reduced parallax in the cartographic field of a point at datum level. By reduced parallax in the cartographic field is meant the parallactic displacement, measured at right angles to the prime meridian, of such a point when its position in the plan made from one of the photographs compared, is determined with reference to its position in the plan made from the other of such photographs. On any line, in the photograph 2, parallel to the prime parallel thereof, the distance measured between the two lines $g \ldots g^1 \ldots g^2$ and $g \ldots g^3 \ldots g^4$ will be equal to $oc$ of equation (14). The displacement $oo$ is determined by direct measurement in the photographs themselves, being equal to the difference between the distances estimated algebraically of the two positions of the point under consideration from the prime meridians of the two photographs respectively. Thus, a pair of comparable photographs, of which one is fitted with a parallacter diagram, will furnish all the material required for determining a contour level in accordance with equation (14). By comparable photographs are meant two photographs of the same area taken from different points but with the same compass bearing, the prime meridian and prime parallel being identified in each photograph and the photographs reduced to scalar equality by the adoption of readings on the $\frac{1}{m}$ scale as hereinbefore defined for measurements made in the two photographs respectively. It is to be observed that the above comparison by means of parallactic displacements expressed in terms of parallacts can be carried out upon the photographs themselves, and does not require previous plotting if the compass bearing is the same in the two photographs compared.

A suitable construction of plotting board as hereinbefore referred to in connection with Figure 4, will now be described with reference to Figures 9, 10 and 11 of the accompanying drawings. It is convenient to mount the plotting board on legs as shown in Figure 9, so that the whole device takes the form of a table. As will be seen, the plotting board, which is indicated as a whole by the reference numeral 1, consists of a shallow box-like framing or structure 10, the top of which constitutes the drawing-board proper and the sides and top of which are hinged as a whole at $10^a$ to the bottom of the box to enable access to be had to the interior. The box itself is made of wood, and its top side 11 is covered by a sheet 12 of plate glass mounted in a frame 13. A rectangular aperture 14 is provided in the upper side 11 of the box to allow of inspection of the slide rule 15 and also of illumination of the photograph 16 during the plotting process. The illumination of the photograph may be effected in any suitable manner as, for example, by means of the electric lamp 17 which is fitted within a reflector 18 mounted within the box 10.

To prepare the plotting board for use, the plate-glass sheet 12 is covered with a sheet 19 of paper which is to be used for plotting the plan, the paper being pasted or otherwise made fast along its edges upon the glass. The paper is cut to a size such as leaves a breadth of about 5 inches of the board uncovered adjacent to the front edge, so that the slide rule 15 can be seen. An aperture of suitable size and shape is cut in the paper sheet 19 in order to provide room for the photograph 16 in that part of the photographic field to which its constants assign it. The photograph, suitably in the form of a negative or transparency, is laid upon the plate glass 12 film side upwards, with a few drops of water introduced between its under surface and the plate glass. A film of water so introduced between two flat glass surfaces will, if very thin, serve as a cementing means for holding the photograph firmly enough in place to resist any disturbing forces likely to be brought to bear upon it. If a more secure or more permanent form of mounting is required, it may be provided by some suitable cement. This mode of mounting allows the photograph to be placed with a great exactitude in the photographic field. Upon the paper a line XPX to serve as the prime meridian is drawn in such a position that its prolongation over the photograph would coincide with the prime meridian of the photograph and pass through the optical centre O at right angles to another line serving as the prime parallel of the photograph. The last-mentioned line is continued on the paper 19 as the prime parallel $h\theta$ of the photographic field. Starting from the above basis, other cardinal lines of the photographic field are drawn, namely the horizon line $h_o$ at a distance equal to $(\tan \theta)F$ from the prime parallel in one direction, and measured in the opposite direction, the parameter parallel $H_p - h_p$ at a distance equal to $(\sec \theta - \tan \theta)F$ from the prime parallel and passing through the field centre P, and the nadir parallel $n_o$ at a distance equal to $(\cot \theta)F$ from the prime parallel. In some cases it will happen that the horizon line and the nadir parallel cannot both be drawn upon the plotting board because of the considerable distance between them, but one or the other will always be within easy distance of the prime parallel, since for no value of $\theta$ do both $(\tan \theta)F$ and $(\cot \theta)F$ exceed the value of F. The missing line, if one or the other be missing, may be represented by a pro-horizon or pro-nadir parallel from which measurements may, when necessary, be taken. Such substituted lines will, of course, be fixed in positions chosen with a view to the simplification of the computations which recourse to substitutes instead of the lines represented may necessitate. The margin line $H_o$ of the cartographic field may be drawn in at a distance of $(\sec \theta)F$ from the parameter parallel.

By way of example, in Figure 9, a triangle $t$ on the photograph 16 has been chosen for plotting on the plan. The plotting process is similar to the operation described with reference to Figure 5, the three angular points of the triangle being plotted one by one on the paper 19, as will be understood from Figure 9, and a triangle T being produced which is the representation in the cartographic field of the triangle $t$; also if desired a similar representation $T_1$ may be produced diagonally opposite to the triangle T as shown in the drawing. If a pro-horizon line has to be used in plotting, the projection on to the parameter parallel of any particular point in the photograph on one side or the other of the prime meridian, will be effected from a point in such pro-horizon line, which is situated on the same side of the prime meridian. The distance between this point and the prime meridian is in the same proportion to the distance at which the point on the photograph lies along an ordinate from the prime meridian, as the distance from the pro-horizon line to the actual horizon line is in proportion to the distance between such ordinate and the said actual horizon line.

The slide rule 15 is for use in facilitating the calculations by which the plotting is controlled and the mounting thereof on the plotting board will now be described. The slide rule itself may be of any known make suitable for the purposes of this invention, and it may be mounted in any convenient manner beneath the plate glass 12 and the aperture 14. It is proposed in the present invention to have the slide part of the rule normally fixed, and the base or body part thereof slidable. For this purpose, the rule may be mounted upon a carrier slide 20 by means of two or more removable clamps 21 which are pointed to grip the body of the rule, as will be seen clearly in Figure 10, while the slide part of the slide-rule may be held between an abutment spring 22 and a screw 22$^a$. The spring 22 and screw 22$^a$, however, will allow of slight movement of the slide part of the slide rule for the purpose of making fine adjustments after main adjustments of the slide rule have been effected by moving the base of the rule. The head of the screw 22$^a$ is situated at one side of the plotting board, as shown, so that it may be easily accessible for adjustment. The slide 20 is provided with a handle or the like 23 by which it can be moved longitudinally, and this longitudinal movement may take place upon a block 24 of wood which is mounted within the shallow box 10. The slide 20 is guided in its movements by a depending tongue 25, at its rear edge, working in the groove 26 in the block. The tongue may be extended upwardly if desired, and bent to serve as a securing means for the body of the slide rule, as shown at 27, in Figure 11, which also clearly shows the groove 26. The cursor 28 of the slide-rule is mounted friction tight upon a rod 29 and may be adjusted along the rod by a handle 30. To allow of fine adjustments, however, the rod 29 is mounted in the box 10 so that it may be moved axially, though not revolved, by a nut 31 and spring 31$^a$. The nut 31 is threaded on one end of the rod while the spring 31$^a$ is disposed at the other end, and the arrangement is such that the screwing-up of the nut will cause movement of the rod, and thus of the cursor, in one direction against the action of the spring, while the slackening of the nut will allow the rod to be moved in the opposite manner by the spring, as will be readily understood. The box is provided with an opening 40 at the front for allowing access to and adjustment of the slide 20 and cursor 28 by means of their respective handles 23 and 30.

The modified form of plotting board illustrated in Figure 11 is distinguished from the construction shown in Figure 9 by the fact that a mirror 32 is employed for effecting illumination of the photograph, light entering through an opening 33 in the rear of the box 10, being projected upwardly for such purpose. The mirror 32 may be hinged as shown so that it may be wholly contained within the box 10 when the plotting board is out of use. In this modification, the box is shown without legs, being mounted on a stand or frame 34 on a table or the like.

It may be stated here that the slide rule 15 aforesaid is not intended for making the actual computations, which will more conveniently be made upon a free slide-rule in the hands of the computer, but must be set to figures, which in general will not be directly obtained by measurements made upon the photograph. For instance, in working the aforesaid equation $$R = \frac{pr}{p-x}$$

by means of a slide rule, it is very convenient to assign such values to R, $x$ and $r$ that the equation may be written $$R = \frac{r}{l-x}.$$

The equation takes that form if for R we write $\frac{R}{p}$, for $x$ we write $\frac{x}{p}$, for $r$ we write $\frac{r}{p}$ and for $p$ we write $p = l$. These substitutions are easily made by means of a slide rule adjusted for the purpose, and the result when obtained can, by the same means, be as easily translated for use by the substitution of R for the computed value $\frac{R}{p}$. It is to serve such purposes of computations ancillary to the main computations, that the mounted slide rule 15 is provided. Obviously, the slide rule 15 could be used for any other purposes for which it might be available.

The form of plotting board illustrated by Figures 12, 13 and 14 is for dealing specifically with cases in which the plan plotted from a given photograph upon the plotting board tends to encroach upon the area occupied by the photograph itself. In order that in such a case, the plan may stand wholly clear of the photograph, two field centres are used instead of a common field centre, as in the case with the plotting boards shown in Figures 5 and 9, and plotting from the photograph on to the plan is effected by the aid of two radial arms which are adapted to move in unison over the photograph and plan about axes coinciding with the two field centres. One part of this double equipment, as it may be termed, serves for identifying points on the photograph and the other part for plotting conjugate points on the plan. As seen in Figure 12, the plotting board comprises two main parts, namely, a drawing board 41 or the like and a frame 42, which carries the radial arms aforesaid and their appurtenant parts as will be hereinafter described. Upon the drawing board, a sheet of paper 43 is pinned or fastened, and upon this the two field centres have been placed as at P and $P^1$. The point P is herein regarded as the field centre of the photographic field and the point $P^1$ the field centre of the cartographic field. The said field centres have been arranged side by side for the sake of convenience in the right and left hand halves respectively of the paper, and it may be said that the right-hand half of the sheet 43 represents a part of the photographic field and the left-hand half thereof a part of the cartographic field. Passing through the field centres the prime meridians XPX and $X^1P^1X^1$ have been drawn in the direction from top to bottom of the paper 43, and in a direction at right angles thereto and also passing through the field centres, the parameter parallel $H_p \ldots P^1 \ldots P \ldots h_p$ of the carto-photo field has been drawn from side to side of the paper. In the photographic field a photograph 16 to be plotted has also been placed in correct position according to the rules hereinbefore given. The portion of the photographic field containing the photograph is, as shown, divided into equal divisions by lines 44 running parallel with the parameter parallel. The distances between the lines 44 may be made according to any suitable scale, for example, an inch scale, and the spaces between the lines are sub-divided into tenths, say, by other parallels. The scale originates from the parameter parallel, and may be indicated by numbering 0, .5, 1, 1.5, 2, etc. as shown to the right-hand side of the photograph. For the sake of illustration, the features of the photograph have been sketched in and the manner of plotting the features will be hereinafter described. Upon the plan side of the plotting board, it will be seen that a perspective diagram 45 of the nature illustrated in Figure 7 has been fitted. This diagram is preferably on a separate sheet of paper or tracing linen pinned on to the board 41, and is applied to the plan in such a manner that the prime meridian and parameter parallel thereof coincide respectively with the prime meridian and parameter parallel on the plan. The perspective diagram, as shown, has parallels 46 which are conjugate to the parallels 44 on the photograph and the spaces between the parallels 46 are sub-divided by other parallels conjugate to those between the parallels 44 on the photograph. For the sake of convenience scale indications 0, .5, 1, 1.5, 2, etc. corresponding to those at the right-hand side of the photograph, are shown on the right-hand side of the perspective diagram.

The two radial arms aforesaid are indicated by the reference numerals 47 and 48. One arm 47, as shown, consists of a glass or transparent plate 49, which allows the photograph to be viewed through it. The transparent plate 49 is preferably mounted in a metal frame 50 for strengthening purposes, and this frame fits into an arcuate support 51 which is adapted to pivot or move circularly upon an arcuate part 52 of the frame 42. This pivotal movement can be provided for in any suitable manner, as by providing the member 51 with a dovetail adapted to slide in an undercut groove 53 in the arcuate frame part 52. As will be seen from the drawing, the said arcuate parts have a common central axis which is coincident with the field centre P, and when movement is imparted to an outwardly extending arm 54 on the part 51, the latter will move in the groove 53 and turn about said axis, the radial arm 47 also turning about the same axis. The other radial arm 48 suitably consists of a metal strip which is slidably mounted in a slot 55 in an arcuate support 56, and the latter is adapted to pivot or be circularly movable upon another arcuate part 57 of the frame 42, as for example by providing the member 56 with a dove-tail slidable in an undercut groove 58 in the frame part 57. These latter arcuate parts have a common central axis which coincides with the field centre $P^1$ so that when movement is imparted to an outwardly extending arm 59 on the member 56, the latter will move about the said axis together with the said radial arm 48. The transparent plate 49 of the radial arm 47 has marked thereon a central longitudinal line 60, passing over the field centre P, and the radial arm 48 is so formed or cut away that its right-hand edge 68 constitutes a line which passes over the field centre P¹. The two arms 54, 59 are connected by a link 61, which causes them to move in unison and maintains parallelism of the radial arms 47, 48. This link 61 is pivotally connected at one end directly to the arm 54, and at the other end to a bridge piece 62 fixed across the arm 59 over the slot 55. If desired, a knob or handle 63 may be provided on the link 61, to facilitate movement of the radial arms 47, 48. The arm 47 is not generally intended to slide upon its support 51, but the arm 48 can be moved in the slot 55 as may be required.

The aforesaid encroachment of the plan upon the photograph is liable to happen particularly when the field centre is situated near the optical centre in the photographic field. In order that in this case the photograph and plan shall be accessible and not covered or obscured by the frame 42 carrying the radial arms 47, 48, the arcuate parts 51, 52 and 56, 57 are used for supporting and pivotally guiding such arms. These arcuate parts, having open centres as shown in Figure 12, provide central clearances at the axes of the radial arms 47, 48, large enough to allow the full extent of the photograph and plan to be accessible.

The frame 42 is adapted to be clamped in position on the board in any suitable manner. For example, the right-hand end may be bent over so that it grips the right-hand edge of the board 41 when a screw-clamp 64 at the other end of the frame is screwed up against the left-hand edge of the board. The clamping of the left-hand part of the frame 42 by the screw-clamp 64 is clearly illustrated in Figure 13. In order to assist the correct placing of the frame 42 on the board, the frame may as shown have incised markings 71 thereon adapted to coincide with the parameter parallel and prime meridians.

In using the alternative form of plotting board shown in Figure 12, the handle 63 is operated so as to move the radial arms 47, 48 and bring the line 60 on the arm 47 directly over the point on the photograph which it is desired to plot. As the plotting must be accurate, however, it is important to place the line 60 correctly and avoid errors due to parallax. Therefore, the well-known expedient of a marked prism is adopted. The prism 65 is shown in Figure 12 in plan and in Figure 14 in perspective. It is adapted to be placed upon the transparent plate 49 and to fit accurately between the side members of the frame 50 of the arm 47, and it is provided with a central mark or line 66 at the top of its forward side as shown in Figure 14. It will now be seen that if (when the arm 47 has been brought over the point to be plotted) the lines 66, 60 and the point are all in line, the line 60 will be directly over the point in question and no error will exist due to parallax.

By way of example, it will be supposed that it is desired to plot on the plan the position of the tree 67 on the photograph. The radial arms 47, 48 are then adjusted, as above described, so as to bring the line 60 on the arm 47 directly over the centre (in plan) of the tree. Owing to the link 61 and pivotal arrangement of the radial arms 47, 48, the arm 48 will be adjusted in unison with the arm 47 and the right-hand edge 68 of the arm 48 will take up a position which is conjugate to the position of the line 60 on the arm 47. The distance between the centre of the tree and the parameter parallel is now noted. It will be seen that the tree is distant 2.3 units from such parallel. A point 69 is then marked on the plan at the intersection of the edge 68 of arm 48 with the 2.3 division on the perspective diagram 45, and this point 69 is conjugate to the position of the tree 67 on the photograph. Similarly, other points on the photograph 16 can be found on the perspective diagram, and the plotted points can be marked on the plan, simply by pricking through the perspective diagram on to the paper beneath. By way of illustration, the outline of the photograph 16 has been plotted on the plan at 70 and points are shown pricked off on the plan, which are conjugate to points along one of the roads on the photograph.

The plumb line beacon or base shown in Figure 15 may be employed as hereinbefore described for finding the nadir point of the photograph into which the beacon is projected. In this figure the plumb line 72, with equally spaced "bobs" 73 is shown suspended from a rod 74 mounted on a tripod stand 75, which may be an ordinary camera stand. This form of base is more or less experimental, but it is suitable for use in photographing small areas from a small height. Obviously it will be understood that when a large extent of ground is to be photographed, and the photograph is to be taken from a great height, a suitable plumb line beacon may be suspended from a balloon or other convenient floating support by which it will be carried at a convenient level below the level of the camera station and in position to be projected upon the photograph.

Claims.

1. The method of producing a map or plan in a process of surveying by photography, comprising photographing the area to be surveyed by means of a camera of accurately known focal length, identifying in the photograph, the optical centre, determining the prime parallel and prime meridian through said centre and deducing the parameter parallel, then placing the photograph on a plotting board comprising photographic and cartograph fields having a field center and marked in the photographic field with prime meridian and parameter parallel as aforesaid determined and correctly positioning such photograph in said photographic field by the aid of said prime meridian and parameter parallel, and finally plotting with respect to the field center and on the cartographic field of the plotting board, the conjugate points of points on the photographic.

2. The method of producing a map or plan in a process of surveying by photography, comprising first photographing the area to be surveyed by means of a camera of accurately known focal length, identifying in the photograph its optical center, determining the prime parallel through said center, deducing therefrom the prime meridian and parameter parallel of the photographic field, then on a plotting board comprising photographic and cartographic fields having a field center and marked in the photographic field with prime meridian and parameter parallel, placing the photograph so that the prime meridian and parameter parallel of the photograph coincide with the corresponding lines marked on the plotting board, and finally plotting with respect to the field center and on the cartographic field of the plotting board the conjugate points of points on the photograph.

3. A process of land surveying by photography, which comprises determining the position of the prime parallel from points located in definite relation in the object space, and the corresponding points on the photograph, such that a value identifying the position of a basic point or points on a line or lines passing through said points in the photograph is in accordance with the following formula $$C = \frac{(a+b)AB}{aB - bA}$$

where $a$ and $b$ are known lengths determined from the disposition of the points in the object space, and A and B are corresponding lengths determined by measurement in the photograph, and, with the aid of such basic point or points and the optical centre, drawing a line passing through the optical centre as prime parallel.

4. A process of land surveying by photography which comprises determining the position of the prime parallel from a set of three points located in a vertical line and whose distances apart on the line are known, and the corresponding points in the photograph, such that a value comprising an extension of such line in or beyond the foreground of the photograph is in accordance with the following formula $$C = \frac{(a+b)AB}{aB - bA}$$

where $a$ and $b$ are the known lengths between the three points and A and B are the measured lengths between the reproduction of said points in the photograph, drawing a line through the end of such extension and through the optical centre and then drawing a line at right angles thereto through the optical centre of the photograph as the prime parallel.

5. The process of land surveying by photography, which comprises forming a combined photographic and cartographic field by rectangular axes and drawing parallel to one of the axes a line intersecting the other axis at a distance ($\sec \theta - \tan \theta$)F where $\theta$ is the angle of dip and F is the focal length of the camera, placing a photograph in said field with the point of intersection in coincidence with the optical centre of the photograph and the intersecting line in coincidence with the prime parallel through said optical centre, and plotting conjugate points of the photograph so placed, on the cartographic field.

6. The process of surveying by photography, which comprises plotting conjugate points of a photographic field on a cartographic field from the origin of polar coordinates in accordance with the formula $$R = \frac{pr}{p-x}$$

where R is the distance in the cartographic field from said origin measured on a line passing through the origin and the point on the photograph, $p$ the secant of the angle of dip multiplied by the focal length of the camera, $x$ the abscissa of the point to be plotted when defined by rectangular co-ordinates taking the parameter parallel and prime meridan for axes, and $r$ the distance from the origin to the point of the photograph.

7. A perspective diagram for use in a process of plotting plans from photographs for the purpose of co-ordinating the cartographic and photographic fields, this diagram having its area divided equally by meridians and harmonically by parallels severally conjugate to similar intersecting lines forming rectangular sub-divisions in one of said fields, said meridians emanating from equally spaced points on the parameter parallel.

8. A perspective diagram for use in a plotting of plans from photographs, the diagram being formed in accordance with the formula $$R = \frac{pr}{p-x}$$

and having harmonic parallels and equally disposed meridians dividing the cartographic field into trapezoids conjugate to rectangular parallelograms represented in the photographic field.

9. A perspective diagram for use in a system of land surveying by photography said diagram divided harmonically by parallels and equably by meridians intersecting the parameter parallel at points spaced equally apart, the common distance apart being equal to the projection on such parallel of the distance, measured parallel to the parameter parallel, between two camera stations from which two photographs to be compared for contour, have been obtained.

10. A parallacter diagram for use in a system of land surveying by photography, said diagram consisting of a meridian line disposed parallel to the prime meridian of one photograph and of a parallacter line placed at an angle to said meridian line, the distance between said meridian and parallacter lines measured at any part of the photograph on a line parallel to the prime parallel thereof serving to measure the calculated reduced parallax of any point on that line with reference to the position of the corresponding point in another photograph of the photographed area.

11. A plotting board comprising a base, a frame, means to secure said frame detachably to said base, radial arms pivotally mounted in said frame, and means to connect said arms for parallel movement about their respective axes coincident with two field centres on said board.

12. A plotting board for facilitating the plotting of a plan from a photograph, such plotting board comprising a base, a frame adapted to be mounted on said base, pivotal supports on said frame adapted to move in unison about respective axes coinciding with two field centres marked on the board, said supports having open centres, and radial arms mounted on said supports respectively and pivotally movable therewith, substantially as set forth.

13. A plotting board for facilitating the plotting of a plan from a photograph, such plotting board comprising a base, a frame adapted to be mounted on said base and comprising arcuate parts, arcuate members pivotally mounted on said arcuate parts of the frame so as to be movable in unison about respective axes coinciding with two field centres marked on the board, and radial arms mounted on said arcuate members respectively and movable therewith, substantially as set forth.

14. In a photographic land surveying system of the character described, photographing the area to be surveyed, with the inclusion in the object space of a beacon base comprising a plumb-line having three photographable centres of definite distances apart along said line for the purpose set forth.

15. In a photographic land surveying system of the character described, the method of plotting from photographs comprising the positioning of a photograph on one part of a plotting board by the aid of the optical center, the prime meridian and field center, and on another part of the board marked with similar prime meridian and field center, plotting conjugate points of points on the photograph with the aid of the two field centers.

JOHN WILLIAM GORDON.